US010210406B2

United States Patent
Huang et al.

(10) Patent No.: US 10,210,406 B2
(45) Date of Patent: Feb. 19, 2019

(54) SYSTEM AND METHOD OF SIMULTANEOUSLY GENERATING A MULTIPLE LANE MAP AND LOCALIZING A VEHICLE IN THE GENERATED MAP

(71) Applicant: Dura Operating, LLC, Auburn Hills, MI (US)

(72) Inventors: Shuo Huang, Farmington, MI (US); Danish Uzair Siddiqui, Etobicoke (CA)

(73) Assignee: DURA OPERATING, LLC, Auburn Hills, MI (US)

( * ) Notice: Subject to any disclaimer, the term of this patent is extended or adjusted under 35 U.S.C. 154(b) by 92 days.

(21) Appl. No.: 15/242,151

(22) Filed: Aug. 19, 2016

(65) Prior Publication Data
US 2018/0053060 A1 Feb. 22, 2018

(51) Int. Cl.
*G06K 9/00* (2006.01)
*G08G 1/16* (2006.01)
(Continued)

(52) U.S. Cl.
CPC ......... *G06K 9/00825* (2013.01); *G01C 21/32* (2013.01); *G06K 9/00798* (2013.01);
(Continued)

(58) Field of Classification Search
CPC ..................... G06K 9/00798; G08G 1/167
See application file for complete search history.

(56) References Cited

U.S. PATENT DOCUMENTS

2008/0033645 A1  2/2008 Levinson et al.
2011/0298602 A1  12/2011 Chen et al.
(Continued)

FOREIGN PATENT DOCUMENTS

DE  102013103953 A1  11/2013
DE  102012215322 A1  3/2014
(Continued)

OTHER PUBLICATIONS

Yang M, Gu X, Lu H, Wang C, Ye L. Panorama-Based Multilane Recognition for Advanced Navigation Map Generation. Mathematical Problems in Engineering. Mar. 23, 2015;2015. (Year: 2015).*
(Continued)

*Primary Examiner* — Nirav G Patel
(74) *Attorney, Agent, or Firm* — Robert E. Ford; Raymond J. Vivacqua; Steven L. Crane

(57) ABSTRACT

A method and system for simultaneously generating a global lane map and localizing a vehicle in the generated global lane map is provided. The system includes a plurality of image sensors adapted to operatively capture a 360-degree field of view image from the host vehicle for detecting a plurality of lane markings. The image sensors include a front long-range camera, a front mid-range camera, a right side mid-range camera, a left side mid-range camera, and a rear mid-range camera. A controller communicatively is coupled to the plurality of image sensors and includes a data base containing reference lane markings and a processor. The processor is configured to identify the plurality of lane markings by comparing the detected lane markings from the 360-degree field of view image to the reference lane markings from the data base and to fuse the identified lane markings into the global lane map.

10 Claims, 4 Drawing Sheets

(51) Int. Cl.
*G01C 21/32* (2006.01)
*G08G 1/0962* (2006.01)

(52) U.S. Cl.
CPC ......... *G08G 1/167* (2013.01); *G08G 1/09626* (2013.01); *G08G 1/166* (2013.01)

(56) References Cited

U.S. PATENT DOCUMENTS

| | | |
|---|---|---|
| 2012/0062745 A1 | 3/2012 | Han et al. |
| 2013/0131980 A1 | 5/2013 | Ginsberg |
| 2014/0257686 A1 | 9/2014 | Feldman et al. |
| 2015/0213617 A1 | 7/2015 | Kim et al. |
| 2015/0292891 A1 | 10/2015 | Kojo |
| 2018/0053060 A1* | 2/2018 | Huang ............... G06K 9/00825 |

FOREIGN PATENT DOCUMENTS

| | | |
|---|---|---|
| DE | 10213211696 A1 | 12/2014 |
| EP | 2918974 A1 | 9/2015 |

OTHER PUBLICATIONS

Zui Tao, Philippe Bonnifait, Vincent Fremont, Javier Iba~nez-Guzman. Mapping and localization using GPS, lane markings and proprioceptive sensors. 2013 IEEE/RSJ International Conference on Intelligent Robots and Systems (IROS), Nov. 2013, Tokyo, Japan. pp. 406-412, 2013. <hal-00880566>.

Zui Tao, Philippe Bonnifait, Vincent Fremont, Javier Iba~nez-Guzman. Lane marking aided vehicle localization. Proceedings of the 16th International IEEE Annual Confererace on Intelligent Transportation Systems (ITSC 2013), Oct. 2013, Hague, Netherlands. pp. 1509-1515, 2013. <hal-00880631>.

* cited by examiner

SYSTEM AND METHOD OF SIMULTANEOUSLY GENERATING A MULTIPLE LANE MAP AND LOCALIZING A VEHICLE IN THE GENERATED MAP

TECHNICAL FIELD

The present disclosure generally relates to a system and method of generating a lane map; more particularly, to simultaneously generating a lane map and localizing a vehicle.

BACKGROUND

The statements in this section merely provide background information related to the present disclosure and may or may not constitute prior art.

In-vehicle Global Positioning System (GPS) navigation systems are widely used by drivers to determine the location of the vehicle and to provide visual directions to a selected destination. A GPS navigation system utilizes a receiver to receive multiple signals from GPS satellites to determine the current location of the vehicle. Based on the change in location of the vehicle per unit time, the direction and speed of the vehicle may be calculated by the GPS navigation system. The GPS navigation system locates the vehicle on a preloaded map and visually displays a representation of the vehicle on the road of travel, the direction of travel of the vehicle, and the speed of the vehicle. The GPS navigation system may also include an inertia sensor to estimate the speed and direction of the vehicle during brief periods where there may be disruptions in receiving sufficient signals from GPS satellites to determine the location of the vehicle. Such disruptions may be encountered when the vehicle travels through tunnels, parking structures, and certain adverse atmospheric conditions.

While the GPS navigation system is capable of providing the general location of the vehicle on a given road, the GPS navigation system does not provide sufficient fidelity to locate the vehicle within a lane on the given road. Typical commercial GPS navigation systems are accurate to within 15 meters on the average, and more modern GPS navigation systems with Wide Area Augmentation System (WAAS) are accurate to approximately three (3) meters.

While an approximately three (3) meter accuracy may be sufficient to locate a vehicle on a given road for the purpose of providing driving directions, there remains a need to accurately and precisely locate a vehicle within a distinct lane of a road. With the ability of locating the vehicle within a specific lane of travel, the GPS navigation system may provide earlier directions to change lanes in preparation for an upcoming change in direction such as exiting on a highway ramp. Also, the vehicle's Advanced Driver Assistance System (ADAS) may be configured to notify the driver if the vehicle is departing the lane of travel, or host lane, without the intention of the driver, such as when the turn indicator is not activated before a lane change. There is also a need to accurately and precisely locate a vehicle within a lane during prolong periods where there is a disruption or absence of signals from GPS satellites.

SUMMARY

A method of lane mapping and localizing of a host vehicle traveling along a road is provided. The method includes the steps of simultaneously capturing a long-range forward field of view image, a mid-range forward field of view image, a right field of view image, a left field of view image, and a rear field of view image; detecting a plurality of lane markings in each of the long-range forward, mid-range forward, right, left, and rear field of view images; identifying each of the plurality of lane markings with reference lane markings stored in a data base; fusing the identified lane markings to generate a global lane map having a plurality of adjacent vehicle lanes; and localizing the host vehicle within a host lane on the global lane map. The right field view image overlaps with both the mid-range forward field of view image and the rear field of view image, and the left field of view image overlaps with both the mid-range forward field of view image and the rear field of view image.

In one aspect, the long-range forward field of view image overlaps with the mid-range forward field of view.

In another aspect, the method further includes the step of detecting a plurality of lane markings sufficiently distance from the host vehicle in the left field of view and right field of view images, such that at least two adjacent lanes are generated on each of the left and right sides of the host vehicle once the lane markings are fused to generate the global lane map.

In another aspect, the method further includes the step of capturing a fish-eye view of at least one of the mid-range forward field of view image, the right field of view image, the left field of view image, and the rear field of view image of the host vehicle.

In another aspect, the method further includes the steps of projecting a path of travel of the host vehicle; extrapolating a forward extension of the host lane; and activating a driver assistance warning if the projected path of travel of the host vehicle deviates from the extrapolated forward extension of the host lane.

In another aspect, the reference lane markings stored in the data base includes a single solid line, a double solid lines, a dashed line, a double dash line, and a dash line with a parallel single solid line.

In another aspect, the method further includes the steps of activating the driver assistance warning if the projected path of travel of the host vehicle intersects a yellow lane marking or a white solid line.

In another aspect, the method further includes the steps of identifying at least one remote vehicle within a lane adjacent to the host lane and localizing the position of the least one remote vehicle on the global lane map relative to the host vehicle.

In another aspect, the method further includes the steps of projecting the path of travel of the at least one remote vehicle; comparing the projected path of travel of the at least one remote vehicle with the projected path of travel of the host vehicle; and activating a driver assistance warning if the projected path of travel of the at least one vehicle intersects with the projected path of travel of the host vehicle.

Another method of generating a global map and localizing a traveling host vehicle is provided. The method includes capturing a plurality of overlapping images of a 360-degree field of view from the host vehicle; detecting a plurality of lane markings within the plurality of overlapping images; identifying each of the plurality of lane markings with reference lane markings; determining the location of the host vehicle from GPS signals; detecting a direction and distance of a remote vehicle relative to the host vehicle; and fusing the identified lane markings, location of host vehicle, and remote vehicle to generate a global lane map having a plurality of adjacent lanes and localization of the host vehicle in a host lane and the remote vehicle within respective lanes in the global lane map.

In one aspect, the method further includes the step of obtaining information on the state of the host vehicle including the host vehicle speed, steering angle, and yaw rate; processing the information on the state of the host vehicle to project a path of travel of the host vehicle; extrapolating a forward extension of the host lane; activating a driver assistance warning if the projected path of travel of the host vehicle deviates from the extrapolated forward extension of the host lane within a predetermined time period without a predetermined input from an operator of the host vehicle.

In another aspect, the method further includes the steps of projecting the path of travel of the remote vehicle; comparing the projected path of travel of the remote vehicle with the projected path of travel of the host vehicle; and activating a driver assistance warning if the projected path of travel of the remote vehicle intersects with the projected path of travel of the host vehicle.

In another aspect, the step of capturing the plurality of overlapping images of a 360-degree field of view from the host vehicle includes simultaneously capturing a long-range forward view image, a mid-range forward view image, a right field of view image, a left field of view image, and a rear field of view image from the host vehicle.

In another aspect, the right field view image overlaps with both the mid-range forward field of view image and the rear field of view image, and the left field of view image overlaps with both the mid-range forward field of view image and the rear field of view image.

A system for simultaneously generating a global lane map and localizing a host vehicle in the generated global lane map is provided. The system includes a plurality of image sensor adapted to operatively capture a 360-degree field of view image from the host vehicle for detecting a plurality of lane markings and a controller communicatively coupled to the plurality of image sensors. The controller includes a data base containing reference lane markings and a processor. The processor is configured to identify the plurality of lane markings by comparing the detected lane markings from the 360-degree field of view image to the reference lane markings from the data base and to fuse the identified lane markings into a global lane map having a plurality of adjacent vehicle lanes.

In one aspect, the system further includes a vehicle locator for determining the location of the host vehicle and a range sensor configured to detect the location and distance of an adjacent remote vehicle with respect to the host vehicle. The controller is communicatively coupled to the vehicle locator and the range sensor. The controller is further configured to localize the host vehicle and remote vehicle on the global map lane.

In another aspect, the system further includes at least one device selected from the group consisting of a sonar, a laser scanner, a LiDAR, and a receiver.

In another aspect, the plurality of image sensor adapted to operatively capture a 360-degree field of view image includes a front long-range camera, a front mid-range camera, a right side mid-range camera, a left side mid-range camera, and a rear mid-range camera.

In another aspect, the controller is configured to project a path of travel of the host vehicle, extrapolate a forward extension of a host lane, and activate a driver assistance warning if the projected path of travel of the host vehicle deviates from the extrapolated forward extension of the host lane.

In another aspect, the controller is further configured to project the path of travel of the remote vehicle, compare the projected path of travel of the remote vehicle with the projected path of travel of the host vehicle, and activate the driver assistance warning if the projected path of travel of the remote vehicle intersects with the projected path of travel of the host vehicle.

Further aspects, examples, and advantages will become apparent by reference to the following description and appended drawings.

BRIEF DESCRIPTION OF THE DRAWINGS

The above and other aspects will become more apparent and more readily appreciated from the following description of exemplary embodiments, taken in conjunction with the accompanying drawings in which.

DETAILED DESCRIPTION

The following description is merely exemplary in nature and is not intended to limit the present disclosure, applications, or uses.

Figure 1:
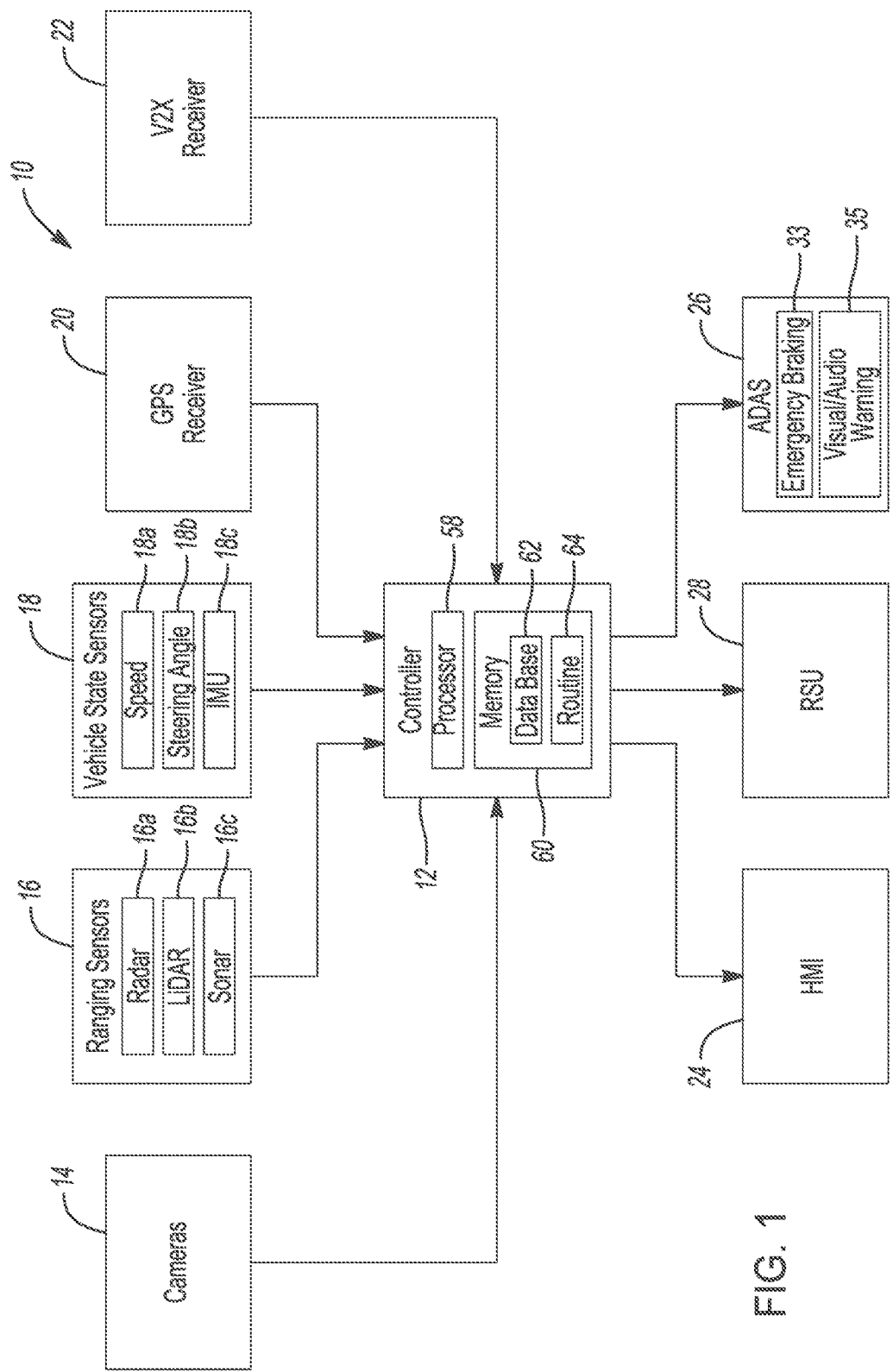
FIG. 1 is a block diagram of a system for simultaneously generating a global lane map and localizing a vehicle in the generated map.

FIG. 1 shows a block diagram of a system 10 for simultaneously generating a global lane map 11 and localizing a vehicle in the generated global lane map 11. The system 10 includes a controller 12 communicatively coupled with cameras 14, ranging sensors 16, vehicle state sensors 18, GPS receiver 20, and/or V2X (i.e. V2V, V2I, etc.) receiver 22. The V2X receiver 22 may be a component of a transceiver. The controller 12 takes the information gathered by the cameras 14, ranging sensors 16, vehicle state sensors 18, GPS receiver 20, and/or vehicle receiver 22 to generate a global lane map 11 having multiple lanes and localize a host vehicle 30 and one or more remote vehicles 31 within their respective lanes within the generated map 11. The generated global lane map 11 may be displayed on Human Machine Interface (HMI) 24 such as an in-dash display monitor 25. The controller 12 may be programmed to project the paths of the host vehicle 30, the host lane 44, and/or remote vehicles 31, and activate an Advance Driver Assistance System (ADAS) 26 if the controller 12 determines that the safety of the host vehicle 30 may be at risk. The ADAS 26 may include activating a driver assistance visual and/or audio warning 35 to alert the driver of the risk and/or activating a vehicle system such as an emergency braking 33. The controller 12 may also transmit information on the state of the host vehicle 30 to a Roadside Unit (RSU) 28 or to a similarly equipped vehicle. The system 10 may leverage sensors commonly found in modern vehicles such as the GPS navigation system, sonar ranging/parking sensors, and rear/blind spot cameras.

Figure 2:
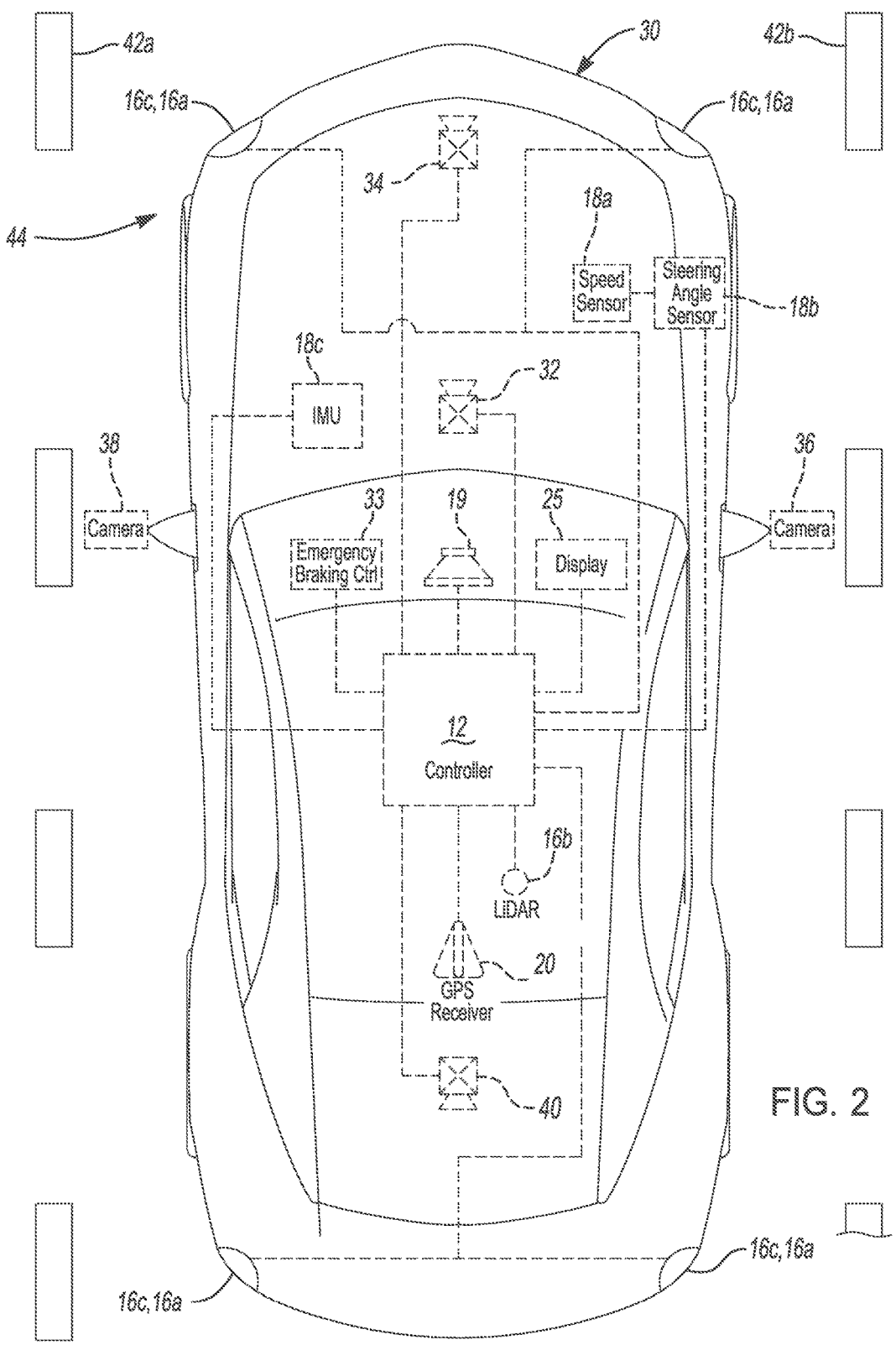
FIG. 2 is a top view illustration of an exemplary vehicle having the system of FIG. 1.
Figure 3:
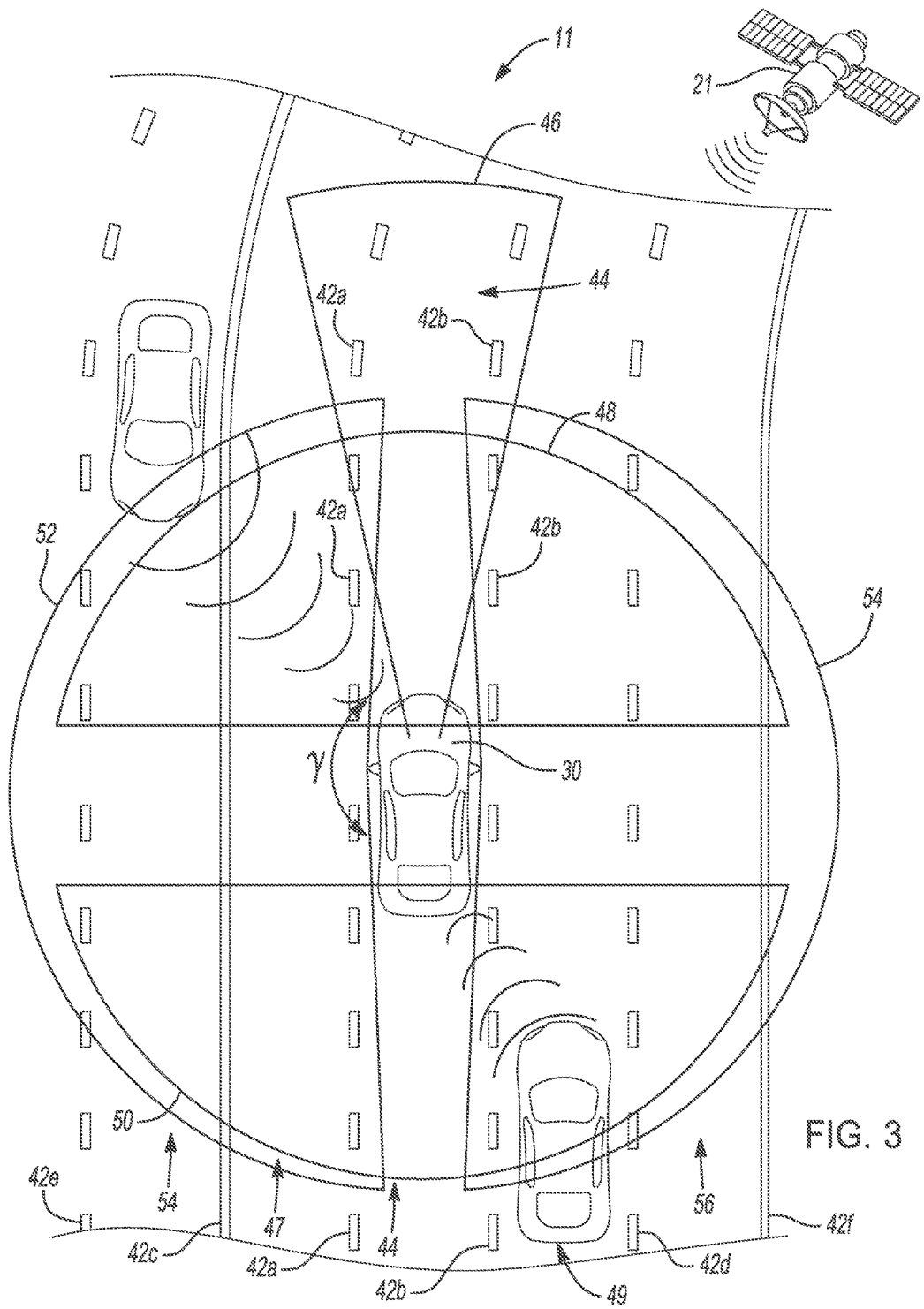
FIG. 3 is an exemplary illustration of a global lane map having multiple lanes generated by the system of FIG. 1.

FIG. 2 shows an exemplary host vehicle 30 equipped with the system 10 of FIG. 1. For illustrative purposes, a passenger type vehicle is shown; however, the vehicle may be that of a truck, sport utility vehicle, van, motor home, or any other type of vehicle without departing from the scope of the present disclosure. The host vehicle 30 includes a front long-range camera 32, a front mid-range camera 34, a right side mid-range camera 36, a left side mid-range camera 38, and a rear mid-range camera 40. Each of the aforementioned cameras 32, 34, 36, 38, 40 is configured to capture visual information in the visible light spectrum and/or in a non-visual (e.g. infrared) portion of the light spectrum in the field of view, or visual area of coverage, of the respective camera. More specifically, each of the aforementioned cameras 32, 34, 36, 38, 40 is configured to capture light waves reflected from the markings imprinted or painted onto the surface of a road way, such as the lane markings 42a, 42b or segment of lane markings that define the instant lane, or host lane 44, that the host vehicle 30 is presently occupying and the lane markings 42a, 42b, 42c, 42d, 42e, 42f that define one or more lanes 47, 49, 54, 56 to the right and left of the host lane 44 as shown in FIG. 3. The aforementioned cameras 32, 34, 36, 38, 40 are further configured to capture the images of objects, such as remote vehicles 31 and on-road objects such as traffic barrels or cones (not shown), within the field of views 46, 48, 50, 52, 54 of the respective cameras 32, 34, 36, 38, 40.

FIG. 3 illustrates an example of the field of views 46, 48, 50, 52, 54 around the host vehicle 30 observed by each of the five cameras 32, 34, 36, 38, 40. The front long-range camera 32 captures a first field of view 46 at an extended range in an arc forward of the host vehicle 30. The first field of view 46 captures lane markings 42a, 42b that define the host lane 44 that the host vehicle 30 is traveling within. The extended range should be at a minimum sufficiently distant forward of the host vehicle 30 such that the operator/driver of the host vehicle 30 has sufficient time to react and apply the brakes to stop the host vehicle 30 upon the operator/driver being alerted of the stationary object by the ADAS 26. As a non-limiting example, the August 2015 edition of "Safety in Num3bers", published by the National Highway Traffic Safety Administration (NHTSA), estimates that it takes up to 387 feet to stop a vehicle traveling at 70 miles/hour on dry pavement. It should be appreciated that other factors such as the conditions of the road, weather, brakes, and tires may significantly affect stopping distance; therefore, it is preferable that a reasonable safety factor should be added to the extended range of the front long-range camera 32.

The front mid-range camera 34 captures a second field of view 48 at an intermediate range, with respect to the long-range camera 32, in the arc forward of the host vehicle 30. The second field of view 48 captures lane markings 42a, 42b that define the host lane 44 forward of the host vehicle 30 and the pairs of lane markings 42c, 42a and 42b,42d that defines lanes 47, 49 immediately to the left and right of the host lane 44. Similar to the front mid-range camera 34, the rear mid-range camera 40 captures a third field of view 50 at an intermediate range, with respect to the long-range camera 32, in the arc rearward of the motor vehicle. The third field of view 50 captures lane markings 42a, 42b that define the host lane 44 rearward of the host vehicle 30 and the pairs of lane markings 42c, 42a and 42b,42d that defines the lanes 47, 49 immediate to the left and right of the host lane 44. The right side mid-range camera 36 and left side mid-range camera 38 capture a fourth field of view 52 and fifth field of view 54, respectively, in arcs left of and right of the host vehicle 30. The fourth field of view 52 captures lane markings 42e, 42c, 42a that define at least two (2) lanes 54, 47 immediately to the left of the host lane 44. The fifth field of view 54 captures lane markings 42b, 42d, 42f that define at least two (2) lanes 49, 56 immediately to the right of the host lane 44.

The first field of view 46 partially overlaps with the second field of view 48. The second field of view 48 partially overlaps with the fourth and fifth field of views 52, 54. The fourth field of view 52 and fifth field of view 54 partially overlap with the third field of view 50. To ensure the overlaps of the field of views 46, 48, 50, 52, 54, one or more of the mid-range cameras 34, 36, 38, 40 may include a fish eye lens to capture a wide field of view of approximately 180 to 190 degrees. The overlapping of the images provides increased certainty in the detected lane markings. It is preferable that the right side mid-range camera 36 and left side mid-range camera 38 capture a wide field of view having an angle $\gamma$ of about 190 degrees to capture any blind spots that the vehicle 30 may have.

Referring back to FIG. 1, the cameras 32, 34, 36, 38, 40 are communicatively coupled to the controller 12, which is located onboard the host vehicle 30. The controller 12 includes a processor 58, non-transitory computer readable memory 60, and a data base 62. It should be appreciated that the controller 12 may employ analog and/or digital control circuitry including application specific integrated circuit (ASIC) for processing the input data from the cameras 32, 34, 36, 38, 40. It should also be appreciated that an ASIC processor may be built into the circuitry of each of the cameras 32, 34, 36, 38, 40 for the processing of the images.

The memory 60 may store the data base 62 and multiple routines that are implemented by the processor 58. Information stored in the data base 62 includes reference road markings as defined by the United States Department of Transportation for conveying messages to roadway users. Exemplary reference road markings include yellow lines separate traffic flowing in opposite direction, in which a solid yellow line indicates that passing is prohibited and dashed yellow line indicates that passing is allowed. Other exemplary markings include white lines separate lanes for which travel is in the same direction, in which a double white line indicates that lane changes are prohibited, a single white line indicates that lane changes are discouraged, and a dashed white line indicates that lane changes are allowed. The combinations of dash and solid lines include a single solid line, a double solid lines, a dashed line, a double dash line, and a dash line with a parallel single solid line. The data base 62 may also contain reference images of objects that may be found on a roadway, such as motor vehicles, infrastructure objects, and pedestrians.

The GPS receiver 20 on the host vehicle 30 receives a plurality of GPS signals from GPS satellites 21, when available, to determine the longitude and latitude of the host vehicle 30 as well as the speed of the host vehicle 30 and the direction of travel of the host vehicle 30. The location, speed, and direction of travel of the host vehicle 30 are displayed on an electronic map, which may be preloaded onto the GPS receiver 20 or stored in the memory 60 of the controller 12. The exemplary vehicle may include a plurality of vehicle state sensors 18 including a speed sensor 18a, steering angle sensor 18b, and Inertial Measure Unit (IMU) 18c communicatively coupled with the controller 12 to determine the state of the vehicle. The memory 60 may contain one or more routines executed by the processor 58 to project the path of the host vehicle 30 based on information gathered by the speed sensor 18a, steering angle sensor 18b, and IMU 18c of the host vehicle 30. This may be useful during short periods where the GPS signal may be temporarily obstructed.

The host vehicle 30 may also include a plurality of ranging sensors 16 communicatively coupled to the controller 12. The purpose of the sensors is to detect objects in the lanes adjacent the host vehicle 30. Each of the ranging sensors 16 may include any ranging technology, including radar 16a, LiDAR 16b, sonar 16c, etc., capable of detecting a distance and direction between an object, such as an adjacent remote vehicle 31, and the host vehicle 30. By way of example only, a sonar ranging sensor 16c is shown mounted to each of the four corners of the host vehicle 30. Referring to FIG. 3, sensor 16c, shown mounted to the front right corner of the host vehicle 30 detects objects in an arch in a detection area that includes the front and right side of the vehicle. Similarly, the sensor 16c mounted to the front left corner of the host vehicle 30 detects object in an arch in a coverage area that include the front and left side of the vehicle. It is preferable, that the detection range of the ranging sensors 16 are sufficient to detect remote vehicles 31 outward of a distance at least the distance of two vehicle lanes from the right and left sides of the host vehicle 30. It is preferable that the effective detection range of the front ranging sensors should be at a minimum sufficiently distant forward of the host vehicle 30 such that the operator/driver of the host vehicle 30 has sufficient time to react and apply the brakes to stop the host vehicle 30 upon perceiving and/or being notified of the stationary object.

The host vehicle 30 may include a receiver 22 communicatively coupled to the controller 12. The receiver 22 may include a circuit configured to use Wi-Fi and/or Dedicated Short Range Communications (DSRC) protocol for communication with road side units (RSU) to receive information such as lane closures, construction-related lane shifts, debris in the roadway, stalled vehicle, and/or communicate with similarly equipped remote vehicles for the determination of location and state of such remote vehicles.

Figure 4:
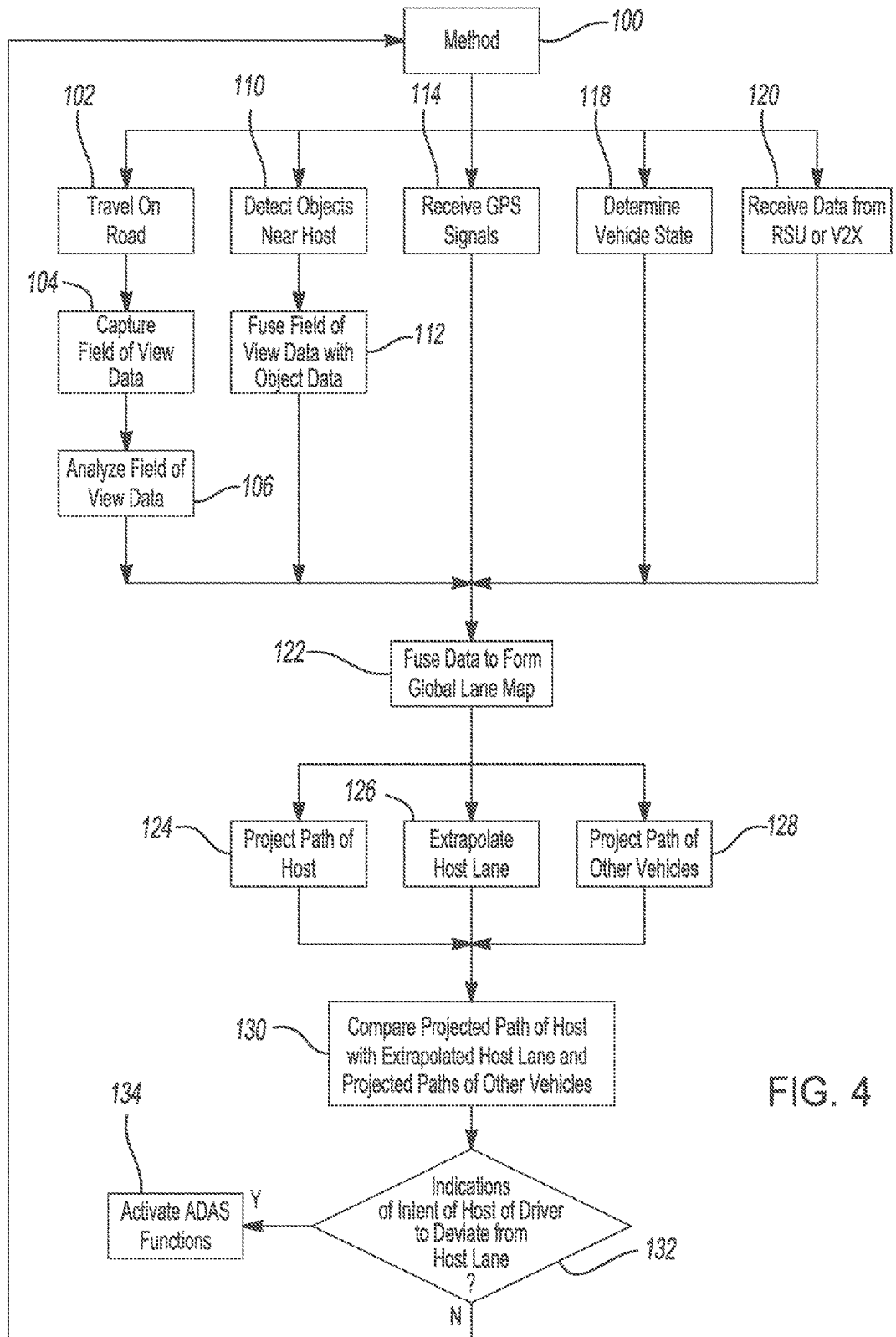
FIG. 4 is a flow diagram presenting a method of simultaneously generating a global lane map and localizing a vehicle in the generated map.

FIG. 4 shows a flow diagram for a method 100 of simultaneously generating a global lane map 11 having multiple lanes and localizing the host and remote vehicles in the generated global lane map 11. This method 100 may be a routine 64 contained in the memory 60 of the controller 12, and executable by the processor 58.

The method 100 begins at step 102, when the host vehicle 30 is traveling along a road. Steps 104, 110, 114, 118, and 120 are concurrently initiated. The method 100 may be continuously repeat as the host vehicle 30 is traveling to provide a real-time global map generation and host vehicle localization.

At step 104 the cameras 14 on the traveling host vehicle 30 simultaneously capture a long-range forward field of view image 46, a mid-range forward field of view image 48, a rear mid-range field of view 50 image, a left mid-range field of view image 52, and a right mid-range field of view image 54 of the host vehicle 30. The left mid-range field of view 52 captures lane markings sufficiently distance from the host vehicle 30 to define at least two (2) lanes immediately to the left of the host vehicle 30. The right mid-ranger field of view 54 captures lane markings sufficiently distance from the host vehicle 30 to define at least two (2) lanes immediately to the right of the host vehicle 30.

At step 106, the processor 58 analyses the field of view images 46, 48, 50, 52, 54 from step 104. The processor 58 first detects any lane markings 42 and objects in each of the field of view images 46, 48, 50, 52, 54. The processor 58 then compares each of the detected lane markings 42 and objects with reference lane markings and objects stored in the data base 62 to identify the types of lane markings, such as solid or dash lines, and objects, such as remote vehicles 31.

At step 110, the ranging sensors 16 detect objects in the immediate vicinity of the host vehicle 30, such as remote vehicles 31 traveling in the lanes adjacent to the right and left sides of the host vehicle 30. The processor 58 determines the relative locations and distances of the detected objects with respect to the host vehicle 30 based on the locations of the ranging sensors 16 mounted on the host vehicle 30.

At step 112, the processor 58 fuses the adjacent objects detected in step 110 with the corresponding identified objects from step 106. The processor 58 may run a routine stored in the memory 60 to continuously monitor the locations of objects and distances of the objects from the host vehicle 30.

At step 114 the GPS receiver 20 receives a plurality of GPS signals form GPS satellites 21. Based on the GPS signals, the GPS receiver 20 or processor 58 determines the location of the host vehicle 30 and localizes the host vehicle 30 on a road of a preloaded map stored in the data base 62.

At step 118, the state of the host vehicle 30 is determined. The vehicle state sensors 18 gather information on the state of the vehicle such as the speed, steering angle, direction, yaw, etc.

At step 120, the receiver 22 receives information from a RSU and/or remote vehicles having V2V communication capabilities. The information received may include lane closures, accidents, construction, and locations of remote vehicles.

At step 122, the processor 58, using recursive Bayesian based methods, such as Extended Kalman Filter, fuses the identified lane markings 42 from step 106; the identified objects, locations of objects, and distances of the objects from the host vehicle from step 112; the location of the host vehicle 30 an a road from step 114; information on the state of the host vehicle from step 118; and road information from step 120 to generate a global lane map 11 having a plurality of adjacent vehicle lanes. The host and adjacent vehicles 30, 31 are localized within their respective lanes on the global lane map 11.

At step 124, the processor 58, executing a routine stored in memory 60, projects the path of the host vehicle 30. The information continuously collected on the state of the vehicle in step 118 may be utilized in calculating the most probable path of travel of the host vehicle 30.

At step 126, the processor 58 extrapolates the path, or extension, of the host lane 44. The information continuously collected on the lane markings from step 106, the host vehicle 30 location on the preloaded map from step 114, and the road information from step 120 may be utilized in calculating the most probable extension of the host lane.

At step 128, the processor 58 projects the paths of the adjacent vehicles. The relative locations and distances of the detected objects with respect to the host vehicle from step 112 may be utilized in calculating the rate of change of the distances and directions between the remote vehicles 31 with respect to the host vehicle.

At step 130, the processor 58 compares the projected path of the host vehicle 30 with the extrapolated path of the host lane 44 and the projected paths of the adjacent remote vehicles 31.

At step 132, if the projected path of the host vehicle 30 is projected to deviate from the extrapolated path of the host lane 44 without indication of intent from the operator of the host vehicle 30, such as activating a turn signal, and/or if the projected path of the host vehicle 30 is projected to intersect with the projected path of an adjacent remote vehicle 31, the processor 58 activates one or more components of the ADAS such as a driver visual/audio warning, emergency braking of the host vehicle 33, etc.

The system 10 and method 100 disclosed herein provide the advantage of increased fidelity in localizing a host vehicle 30 within a host lane 44 on the road of travel. The system 10 and method 100 also provide the advantage of increased fidelity in localizing remote vehicles 31 adjacent the host vehicle 30 within their respective lanes of travel. With the increased fidelity, the host vehicle 30 may extrapolate the path of the host lane 44 and project the path of travel of the host and remote vehicles 30,31 and activate the ADAS if the controller 12 determines there is immediate risk to the host vehicle 30.

The method 100 may then repeat to provide continuous, real-time global map generation and host vehicle localization, as well as monitoring road conditions and adjacent vehicles for activating the ADAS.

The description of the invention is merely exemplary in nature and variations that do not depart from the gist of the invention are intended to be within the scope of the invention. Such variations are not to be regarded as a departure from the spirit and scope of the invention. While some examples and embodiments for carrying out the claimed invention have been described in detail, various alternative designs and embodiments exist for practicing the invention defined in the appended claims.

The following is claimed:

1. A method of lane mapping and localizing of a host vehicle traveling along a road, the method comprising the steps of:
   simultaneously capturing a long-range forward field of view image, a mid-range forward field of view image, a right field of view image, a left field of view image, and a rear field of view image;
   detecting a plurality of lane markings in each of the long-range forward, mid-range forward, right, left, and rear field of view images;
   identifying each of the plurality of lane markings with reference lane markings stored in a data base;
   fusing the identified lane markings to generate a global lane map having a plurality of adjacent vehicle lanes; and
   localizing the host vehicle within a host lane on the global lane map;
   detecting a plurality of lane markings sufficiently distance from the host vehicle in the left field of view and right field of view images, such that at least two adjacent lanes are generated on each of the left and right sides of the host vehicle once the lane markings are fused to generate the global lane map;
   projecting a path of travel of the host vehicle;
   extrapolating a forward extension of the host lane; and
   activating a driver assistance warning if the projected path of travel of the host vehicle deviates from the extrapolated forward extension of the host lane,
   wherein the right field view image overlaps with both the mid-range forward field of view image and the rear field of view image, and the left field of view image overlaps with both the mid-range forward field of view image and the rear field of view image, the long-range forward field of view image overlaps with the mid-range forward field of view, and wherein the reference lane markings stored in the data base includes a single solid line, a double solid lines, a dashed line, a double dash line, and a dash line with a parallel single solid line.

2. The method of claim 1, further comprising the step of capturing a fish-eye view of at least one of the mid-range forward field of view image, the right field of view image, the left field of view image, and the rear field of view image of the host vehicle.

3. The method of claim 1, further comprising the steps of activating the driver assistance warning if the projected path of travel of the host vehicle intersects a yellow lane marking or a white solid line.

4. The method of claim 1, further including the steps of:
   identifying at least one remote vehicle within a lane adjacent to the host lane; and
   localizing the position of the least one remote vehicle on the global lane map relative to the host vehicle.

5. The method of claim 4, further including the steps of:
   projecting the path of travel of the at least one remote vehicle;
   comparing the projected path of travel of the at least one remote vehicle with the projected path of travel of the host vehicle; and
   activating a driver assistance warning if the projected path of travel of the at least one vehicle intersects with the projected path of travel of the host vehicle.

6. A system for simultaneously generating a global lane map and localizing a host vehicle in the generated global lane map, the system comprising:
   a plurality of image sensors adapted to operatively capture a 360-degree field of view image from the host vehicle for detecting a plurality of lane markings; and
   a controller communicatively coupled to the plurality of image sensors and includes a data base containing reference lane markings and a processor;
   a vehicle locator for determining the location of the host vehicle from GPS signals received by a GPS receiver; and
   a range sensor configured to detect the location and distance of an adjacent remote vehicle with respect to the host vehicle,
   wherein the controller is communicatively coupled to the vehicle locator and the range sensor, and the controller is further configured to localize the host vehicle and remote vehicle on the global map lane, and wherein the processor is configured to identify the plurality of lane markings by comparing the detected lane markings from the 360-degree field of view image to the reference lane markings from the data base and to fuse the identified lane markings into a global lane map having a plurality of adjacent vehicle lanes.

7. The system of claim 6, further comprising at least one device selected from the group consisting of a sonar, a laser scanner, a LiDAR, and a receiver.

8. The system of claim 7, wherein the plurality of image sensor adapted to operatively capture a 360-degree field of view image includes a front long-range camera, a front mid-range camera, a right side mid-range camera, a left side mid-range camera, and a rear mid-range camera.

9. The system of claim 8, wherein the controller is configured to project a path of travel of the host vehicle, extrapolate a forward extension of a host lane, and activate a driver assistance warning if the projected path of travel of the host vehicle deviates from the extrapolated forward extension of the host lane.

10. The system of claim 9, where the controller is further configured to project the path of travel of the remote vehicle, compare the projected path of travel of the remote vehicle with the projected path of travel of the host vehicle, and activate the driver assistance warning if the projected path of travel of the remote vehicle intersects with the projected path of travel of the host vehicle.

* * * * *